US008298997B2

(12) United States Patent
Varadaraj et al.

(10) Patent No.: US 8,298,997 B2

(45) Date of Patent: Oct. 30, 2012

(54) CORE ANNULAR FLOW OF HEAVY CRUDE OILS IN TRANSPORTATION PIPELINES AND PRODUCTION WELLBORES

(75) Inventors: Ramesh Varadaraj, Flemington, NJ (US); Eugene R. Thomas, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 835 days.

(21) Appl. No.: 12/305,636

(22) PCT Filed: Jun. 14, 2007

(86) PCT No.: PCT/US2007/013900
§ 371 (c)(1),
(2), (4) Date: Dec. 18, 2008

(87) PCT Pub. No.: WO2008/020908
PCT Pub. Date: Feb. 21, 2008

(65) Prior Publication Data

US 2009/0203562 A1 Aug. 13, 2009

Related U.S. Application Data

(60) Provisional application No. 60/838,062, filed on Aug. 16, 2006.

(51) Int. Cl.
*C09K 8/58* (2006.01)

(52) U.S. Cl. ........ 507/259; 507/258; 507/263; 507/265; 507/276; 166/305.1

(58) Field of Classification Search ........................ None
See application file for complete search history.

(56) References Cited

U.S. PATENT DOCUMENTS 3,502,103 A 3/1970 Verschuur
3,520,313 A 7/1970 Seymour
3,811,506 A * 5/1974 Carlin ........................ 166/270.1
3,826,279 A 7/1974 Verschuur (Continued)

FOREIGN PATENT DOCUMENTS

GB 159533 2/1921

(Continued)

OTHER PUBLICATIONS

Deng, S. et al., "Destabilization of oil droplets in produced water from ASP flooding", *Colloids and Surfaces A*: Physicochem. Eng. Aspects 252, 2005, pp. 113-119, Elsevier Science Ltd., UK.

(Continued)

*Primary Examiner* — John J Figueroa

(74) *Attorney, Agent, or Firm* — ExxonMobil Upstream Research Company-Law Deparment

(57) ABSTRACT

A method is provided for enhancing the shear stability of a high-viscosity fluid-water flow system, such as a core annular flow system. The method employs a family of demulsifier additives for maintaining separation of the fluids in biphasic flow. The additive family is sodium salts of polynuclear aromatic sulfonic acids. In one aspect, the high-viscosity fluid is heavy oil. A method of transporting heavy oil through a tubular body is also provided. The method includes pumping the heavy oil through the tubular body within an annular flow of water, and subjecting the water in the tubular body to a salt of a polynuclear, aromatic sulfonic acid additive so as to improve shear stability of the heavy oil and water.

29 Claims, 5 Drawing Sheets

U.S. PATENT DOCUMENTS

| | | | | |
|---|---|---|---|---|
| 3,886,972 | A | 6/1975 | Scott et al. | |
| 3,892,252 | A | 7/1975 | Poettmann | |
| 3,977,469 | A | 8/1976 | Broussard et al. | |
| 4,821,757 | A | 4/1989 | Hayes et al. | |
| 5,385,175 | A | 1/1995 | Rivero et al. | |
| 5,445,179 | A | 8/1995 | Di Lullo et al. | |
| 5,988,198 | A | 11/1999 | Neiman et al. | |
| 6,168,702 | B1 | 1/2001 | Varadaraj et al. | |
| 6,489,368 | B2 | 12/2002 | Varadaraj et al. | |
| 6,555,009 | B2 | 4/2003 | Varadaraj | |
| 6,599,949 | B2 | 7/2003 | Varadaraj et al. | |
| 6,716,358 | B2 | 4/2004 | Varadaraj | |
| 7,014,773 | B2 | 3/2006 | Varadaraj | |
| 7,732,387 | B2 * | 6/2010 | Varadaraj et al. | 508/390 |
| 2004/0014821 | A1 | 1/2004 | Varadaraj | |
| 2005/0258070 | A1 * | 11/2005 | Varadaraj et al. | 208/48 AA |
| 2005/0258071 | A1 | 11/2005 | Varadaraj et al. | |
| 2006/0183950 | A1 | 8/2006 | Varadaraj et al. | |

FOREIGN PATENT DOCUMENTS

| | | | |
|---|---|---|---|
| WO | WO 2005/113726 | A1 | 12/2005 |
| WO | WO 2005/113727 | A2 | 12/2005 |
| WO | WO 2008/020907 | A2 | 2/2008 |
| WO | WO 2008/020909 | A2 | 2/2008 |

OTHER PUBLICATIONS

Khan, Z. H. et al., "Improvement of the quality of heavily weathered crude oils", *Fuel*, 1995, pp. 1375-1381, v. 74 No. 9, Elsevier Science Ltd., UK.

Kokal S. et al., "Oil-Water Separation Experience from a Large Oil Field", SPE 93386, 14th SPE Middle East Oil & Gas Conference, Mar. 12-15, 2005, pp. 1-9, Bahrain.

Mohtadi, M. F. et al., "Effect of Temperature on Flocculation of Aqueous Dispersions", *Water Research Pergamon Press*, 1973, pp. 747-767, v. 7, UK.

Peigne, G. et al., "Improving the Pumping of Viscous Oil by the Use of Demulsifiers or by an Annular Water Injection", 1998, 20th Annv. Oil Spill Conference, pp. 175-180, San Antonio, TX.

Varadaraj, R. et al., "Molecular Origins of Heavy Crude Oil Interfacial Activity, Part 1: Fundamental Interfacial Properties of Asphaltenes Derived from Heavy Crude Oils and Their Correlation to Chemical Composition", Energy & Fuels, 2007, pp. 195-198, v 21, Washington, DC.

Varadaraj, R. et al., "Molecular Origins of Heavy Crude Oil Interfacial Activity, Part 2: Fundamental Interfacial Properties of Model Naphthenic Acids and Naphthenic Acids Separated from Heavy Crude Oils", Energy & Fuels, 2007, pp. 199-204, v 21, Washington, DC.

Varadaraj, R. et al., "Molecular Origins of Heavy Crude Oil Interfacial Activity, Part 3: Characterization of the Complex Fluid Rag Layer Formed at Crude Oil-Water Interfaces", Energy & Fuels, 2007, pp. 1617-1621, v 21, Washington, DC.

Yang, M. et al., "Interactions Between Chemical Additives and Their Effects on Emulsion Separation", SPE 36617, SPE Annual Technical Conference, Oct. 6-9, 1996, pp. 453-463, Denver, CO.

European Search Report No. 114399, Feb. 28, 2007, 3 pages.

Gallup, D. L. et al., "West Seno Deepwater Development Case History-Production Chemistry", SPE 92969, SPE International Symposium on Oilfield Chemistry, Feb. 2-4, 2005, pp. 1-13, Houston, TX.

Grant, C. et al., "Long Distance Pipelining of Bitumous Froth", 47th Annual Technical Meeting of the Petroleum Society, Jun. 10-12, 1996, pp. 1-22, Calgary, AB, Canada.

Holloway, F. H., "The chemical treatment of offshore oil and gas production", SPE 6678, 1977, pp. 1-10.

Joseph, D. D, "Lubricated Transport", 18th Symposium on Energy Engineering Sciences, May 15-16, 2000, pp. 57-64, Argonne, IL.

Joseph, D. D, "Lubricated Transport of Viscous Materials", *Fluid Mechanics and its Applications*, IUTAM Symposium, Jan. 7-10, 1997, pp. 1-24, v 43, Kluwer Academic Publishers, Netherlands.

* cited by examiner

CORE ANNULAR FLOW OF HEAVY CRUDE OILS IN TRANSPORTATION PIPELINES AND PRODUCTION WELLBORES

CROSS REFERENCE TO RELATED APPLICATIONS

This application is the National Stage of International Application No. PCT/US2007/013900, filed 14 Jun. 2007, which claims the benefit of U.S. Provisional Application No. 60/838,062, filed 16 Aug. 2006.

BACKGROUND OF THE INVENTION

1. Field of the Invention

The present invention relates to the field of fluid flow. More specifically, the present invention relates to the flow of viscous fluids in a fluid transportation system. An example is the flow of heavy crude oil in tubular transport bodies.

2. Background of the Invention

The production of heavy oil reserves is becoming increasingly useful to the petroleum industry. This is because the increasing value of oil reserves makes the production of heavier hydrocarbons more cost-effective. The cost of producing and then transporting heavy oil is greater than the costs for lighter oils because of its high viscosity. High fluid viscosity leads to increased friction within the fluid transportation system due to the shear stresses acting between the surfaces or walls of tubular members and the fluid being transported. This causes pressure drops in the fluid transportation system. In extreme situations, the viscous fluid being transported can stick to the walls of the tubular members, particularly at points of sharp flow direction change.

Most heavy oil and bitumen is transported by providing an additive to reduce the oil viscosity. The most common methods for reducing viscosity involve either blending the heavy oil with a low viscosity hydrocarbon diluent, or upgrading the heavy oil through early conversion and/or separation.

A known concept for reducing pressure drops for fluid transportation systems carrying heavy oil is to use core annular flow. The method involves forming a biphasic flow system wherein a higher viscosity fluid is the “core,” and a lower viscosity fluid is injected as a surrounding “annulus.” The biphasic fluid is introduced into the fluid transportation system, such as a pipeline, and propagated through the length of the fluid transportation system. For heavy oil transport, the heavy oil is the core and water is the annulus.

Core annular flow of heavy oil has been tested; however, such core annular flows in fluid transportation systems have not been widely practiced. One obstacle is that conventional tubing and pipeline conduits have an affinity for adhesion of heavy oil. Several patents describe the reduction of friction within the pipeline flow regime. For instance, U.S. Pat. No. 3,520,313 discloses the use of so-called polymeric drag reducers. These polymeric drag reducers include polyacryl amides, polyalkylene oxides, polyvinyl acetates, and polyvinyl sulfonic acids. U.S. Pat. No. 3,977,469 discloses the placement of an oleophobic film-forming agent in the water phase. This oleophobic film-forming agent is an aqueous solution of a water-soluble salt selected from silicates, borates, carbonates, sulfates, phosphates and mixtures thereof. Further, U.S. Pat. No. 5,385,175 discloses the use of a conduit wherein the inner surface is substantially hydrophobic and oleophobic.

Also, various patents describe the use of hardware and flow systems for moving biphasic fluid. Examples include U.S. Pat. Nos. 3,502,103; 3,826,279; 3,886,972; and 3,977,469.

These tools and systems are utilized to reduce contact between the oil and pipe walls, resulting in lower pressure drops and higher, more stable flow rates.

Fluid stabilizers have been added to core flow systems in an attempt to facilitate the movement of oil through the annular water regime. For instance, G.B. Pat. No. 159,533 describes the use of stabilizers, such as silicates ($Na_2SiO_3$), phosphates, borates, and sulfates. U.S. Pat. No. 5,988,198 (the ’198 patent) describes the use of colloidal silica and clay as part of a self-lubricating flow system. The ’198 patent particularly provides a process for transporting de-aerated bitumen froth containing 20 to 40% by volume froth water. The froth water contains colloidal-size particles with amphilic properties, which are particles that are hydrophilic but readily stick to the crude oil. The particles are carried through the pipeline to establish self-lubricated core-annular flow of the de-aerated bitumen froth. U.S. Pat. No. 3,892,252 discloses a method for increasing the flow capacity of a pipeline used to transport fluids by introducing a micellar system into the fluid flow. The micellar system comprises a surfactant, water and a hydrocarbon, and may be carried through fluids or a pig.

The economics of core annular flow have been further hindered by the large quantities of water utilized and the difficulties in maintaining the core annular flow regime under shear. In this respect, the shear forces acting at the water-heavy oil interface induce destabilization of the fluids. Therefore, a need exists for an improved core annular flow system. Further, a need exists for a core annular flow system wherein the shear-induced destabilization of the oil-water interface is reduced.

SUMMARY OF THE INVENTION

A method is provided for enhancing the shear stability of a high-viscosity fluid-water flow system. The method employs a family of demulsifier additives used in maintaining separation of the fluids in the biphasic flow system. The additive family is sodium salts of polynuclear aromatic sulfonic acids, referred to sometimes as “PASS additives.” In one aspect, the high-viscosity fluid is heavy oil. Preferably, the biphasic flow system is a core annular flow system.

The oil in the fluids may be any heavy oil, including heavy crude oil and bitumen. The oil may contain other materials such as stabilizing fine solids (including silica, clay, and/or $BaSO_4$), as well as asphaltenes, naphthenic acid compounds, resins, and mixtures thereof. The water may be any aqueous solution, including brine.

Preferably, the additive is derived from the chemical formula:

$$Ar—(SO_3^-X^+)_n$$

where:

“Ar” is a homonuclear or heteronuclear aromatic ring of at least 6 carbon atoms, “X” is selected from Group I and II elements of the long form of The Periodic Table of Elements, and “n” ranges from 1 to 10.

The salt may, for instance, be a sodium salt, a potassium salt, a calcium salt, or a magnesium salt. Preferably, the polynuclear, aromatic sulfonic acid contains no alkyl substituents.

The core annular flow system may be used, for example, in a pipeline for transporting hydrocarbons. Alternatively, the core annular flow system may be used in production tubing in a wellbore. Alternatively still, the core annular flow system may be used in a flowline as part of a gathering system.

Non-limiting examples of suitable PASS additives include:

1-naphthalene sulfonic acid;

2,6 naphthalene disulfonic acid;

1,5 naphthalene disulfonic acid;

1,3,6 naphthalene trisulfonic acid; and 1,3,6,8-pyrene tetrasulfonic acid.

The PASS additives may also be mixtures of two or more sodium salts of polynuclear, aromatic sulfonic acids.

A method of transporting heavy oil through a tubular body or member is also provided. In one aspect, the method includes placing a heavy oil in the tubular body, pumping the heavy oil through the tubular body within an annular flow of water, and subjecting the water in the tubular body to a salt of a polynuclear, aromatic sulfonic acid additive so as to improve shear stability of the heavy oil and water. The tubular body is preferably a pipeline for transporting the heavy oil.

The salt of a polynuclear, aromatic sulfonic acid may be a PASS additive, as described above. In one aspect, the PASS additive is mixed with water or a solvent as a delivery carrier. The solvent may be crude oil distillates boiling in the range of about 70° C. (Celsius) to about 450° C., alcohols, ethers, or mixtures thereof. The solvent may be present in an amount of from about 35% weight (wt.) to about 75% wt. in the additive.

BRIEF DESCRIPTION OF THE DRAWINGS

So that the manner in which the features of the present invention can be better understood, certain drawings, charts, micrographs and flow charts are appended hereto. It is to be noted, however, that the drawings illustrate only selected embodiments of the inventions and are therefore not to be considered limiting of scope, for the inventions may admit to other equally effective embodiments and applications.

DETAILED DESCRIPTION OF CERTAIN EMBODIMENTS

Definitions

Figure 1:
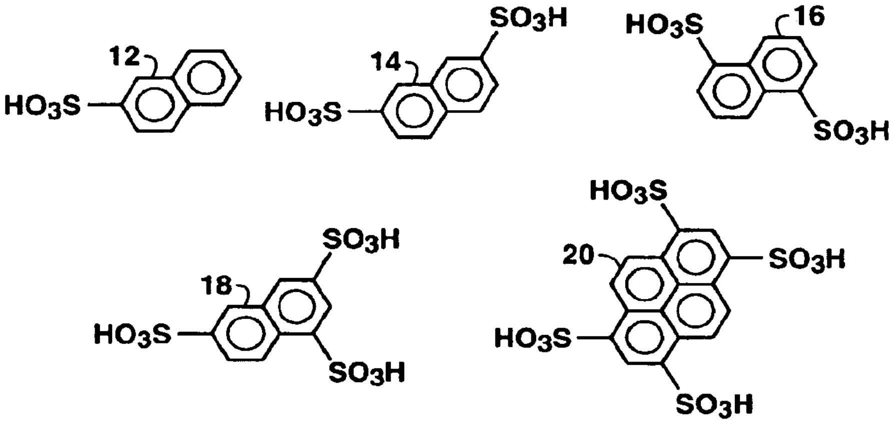
FIG. 1 is chemical structures of certain illustrative polyaromatic sulfonic acids with the sodium salts of these compounds being evaluated.

As used herein, the term "biphasic flow system" refers to a fluid flow system for the transportation of two fluids having a different viscosity. In a preferred example, the two fluids are water and any hydrocarbon having a viscosity different than water. Such a system may be run through any tubular body or member, such as a pipe, including but not limited to production strings in a wellbore, transportation pipelines, or flow lines at a gathering station.

The term "core annular flow system" refers to a biphasic fluid flow system in which a high viscosity fluid, such as heavy oil is transported within an annulus of water.

The term "shear stability" means the ability to maintain a biphasic fluid flow system.

The term "polynuclear aromatic sulfonic acid" refers to any group of organic compounds having multiple aromatic rings and a sulfonic functional group.

The term "demulsification" means an action by a demulsifier to break emulsions. The term "demulsifier" refers to any surface active agent that acts to break emulsions or separate water from oil or cause water droplets to be attracted to one another.

The term "bitumen" means any naturally occurring, non-crystalline solid or viscous hydrocarbon material that is substantially soluble in carbon disulfide.

"Hydrocarbons" are organic material with molecular structures containing carbon and hydrogen. Hydrocarbons may also include other elements, such as, but not limited to, halogens, metallic elements, nitrogen, oxygen, and/or sulfur.

"Oil" means a fluid containing a mixture of condensable hydrocarbons.

The term "heavy oil" refers to viscous hydrocarbon fluids, having a viscosity generally greater than about 100 centipoise at ambient conditions (15° C. and 1 atmospheric (atm) pressure). Heavy oil generally has American Petroleum Institute (API) gravity below about 20°, and most commonly about 10° to 20°. Heavy oil may include carbon and hydrogen, as well as smaller concentrations of sulfur, oxygen, and nitrogen. Heavy oil may also include aromatics or other complex ring hydrocarbons. For purposes of this disclosure, the term "heavy oil" includes bitumen and tar sands.

The term "wellbore" refers to a hole in a formation made by drilling or insertion of a conduit into the formation. A wellbore may have a substantially circular cross section, or other cross-sectional shapes (e.g., circles, ovals, squares, rectangles, triangles, slits, or other regular or irregular shapes). As used herein, the terms "well" and "opening," when referring to an opening in the formation may be used interchangeably with the term "wellbore."

The terms "production fluids" or "produced fluids" refer to fluids produced from a hydrocarbon-bearing formation. Such fluids may carry solid materials, and may include fluids and solids previously injected during drilling or well treatment. Such fluids may or may not contain organic acids such as asphaltenes.

"High viscosity fluid" means a fluid having a viscosity greater than about 100 centipoise at ambient conditions (15° C. and 1 atm pressure).

Descripton of Specific Embodiments

A method is provided for enhancing the shear stability of a high-viscosity fluid—water biphasic flow system. As noted above, the term "biphasic flow system" refers to a fluid flow system for the transportation of water and any hydrocarbon having a viscosity different than water. Such a system may be run through any tubular body or member (e.g. pipe), including but not limited to a production string in a wellbore, a transportation pipeline, or a flow line at a gathering station.

Preferably, the biphasic flow system is a core annular flow system. As noted above, the term "core annular flow system" refers to a biphasic flow system in which a high viscosity fluid, such as heavy oil, is transported within an annulus of water.

The method employs a family of demulsifier additives used in maintaining separation of the fluids in the biphasic flow system. The additive family comprises sodium salts of polynuclear aromatic sulfonic acids. These may be referred to in shorthand as "PASS additives" or as "PASS compounds." The PASS additives are used to provide improved core annular flow of heavy crude oil. More specifically, the PASS additives enhance the shear stability of a heavy oil—water interface in a core annular system.

The aqueous phase of the flow system comprises water. The water may constitute "brine," and may include dissolved inorganic salts of chloride, sulfates and carbonates of Group I and II elements of the long form of The Periodic Table of Elements. Organic salts can also be present in the aqueous phase. However, it is preferred that fresh water be used.

It is preferred that the PASS additives have the structure:

$$Ar—(SO_3^-X^+)_n$$

wherein:

"Ar" is a homonuclear or heteronuclear aromatic ring of at least 6 carbon atoms, "X" is selected from the group consisting of Group I or Group II of the long form of The Periodic Table of Elements; and "n" ranges from 1 to 10.

Preferably, the "X" element is sodium, potassium, calcium or magnesium.

FIG. 1 presents a series of chemical structures for different molecules. Each molecule represents an illustrative aromatic sulfonic acid. The aromatic compounds demonstrated in FIG. 1 are:

1-naphthalene sulfonic acid (1-NSS) 12, 2,6-naphthalene disulfonic acid (2,6-NDSS) 14, 1,5-naphthalene disulfonic acid (1,5-NDSS) 16, 1,3,6-naphthalene trisulfonic acid (1,3,6-NTSS) 18, and 1,3,6,8-pyrene tetra sulfonic acid (1,3,6,8-PTSS) 20.

It is understood that the numerical listings before the compounds indicates the position of the substituent on the aromatic rings. However, other positions on the rings may be suitable. Thus, the above listing is merely illustrative.

Polynuclear aromatic sulfonic acid compounds such as those of FIG. 1 are available from Aldrich Chemical Company, Inc. of Milwaukee, Wis. They are available as sodium salts of the aromatic sulfonic acids. Sodium salts of the polynuclear aromatic sulfonic acids, such as those shown in FIG. 1, exhibit a surprising and unique combination of properties that render them effective for heavy oil—water core annular system stabilization.

Applicant has conducted tests to confirm the suitability of sodium salts of the polynuclear aromatic sulfonic acid compounds as a demulsifying agent in the oil industry. In the demulsification of crude oil and water, certain characteristics of demulsifiers are desirable. For instance, demulsifiers should be water soluble. Demulsifiers should also be thermally stable to temperatures over 100° C., and preferably up to even 500° C. Also, a demulsifier should not decrease the interfacial tension between heavy oil and water. These characteristics are also beneficial for enhancing the shear stability of a heavy oil—water core annular system.

Figure 2:
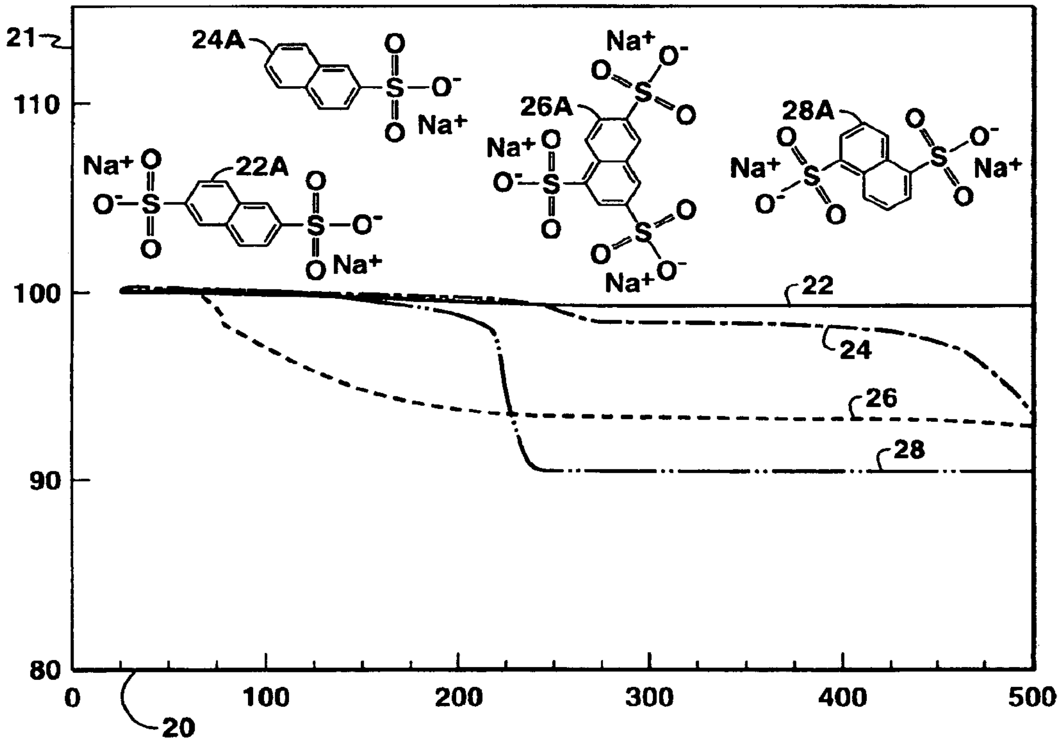
FIG. 2 shows results of a thermogravimetric analysis (TGA) of certain of the sodium salts of the compounds of FIG. 1.

Properties of certain sodium salts of the polynuclear aromatic sulfonic acids are discussed herein. FIG. 2 demonstrates a Thermogravimetric Analyses (TGA) test for sodium salts of four PASS additives. The four PASS compounds are:

2,6-naphthalene disulfonic acid sodium salt (denoted at 22), 2-naphthalene sulfonic acid sodium salt (denoted at 24), 1,3,6-naphthalene trisulfonic acid sodium salt hydrate (denoted at 26), and 1,5-naphthalene disulfonic acid sodium salt hydrate (denoted at 28).

Chemical structures for the four PASS molecules 22, 24, 26, 28 are shown at the top of FIG. 2 and denoted as 22A, 24A, 26A, and 28A respectively.

The thermogravimetric analysis (TGA) chart of FIG. 2 provides a plot of temperature 20 (measured in degrees Celsius) on the x-axis, versus percent (by weight) of solution 21 on the y-axis. It is shown that as temperature increases 20, the weight percent 21 drops, but by less than 10% in each case. Therefore, it is demonstrated that the PASS compounds are thermally stable. Indeed, the PASS compounds were thermally stable even up to 450° C.

Figure 3:
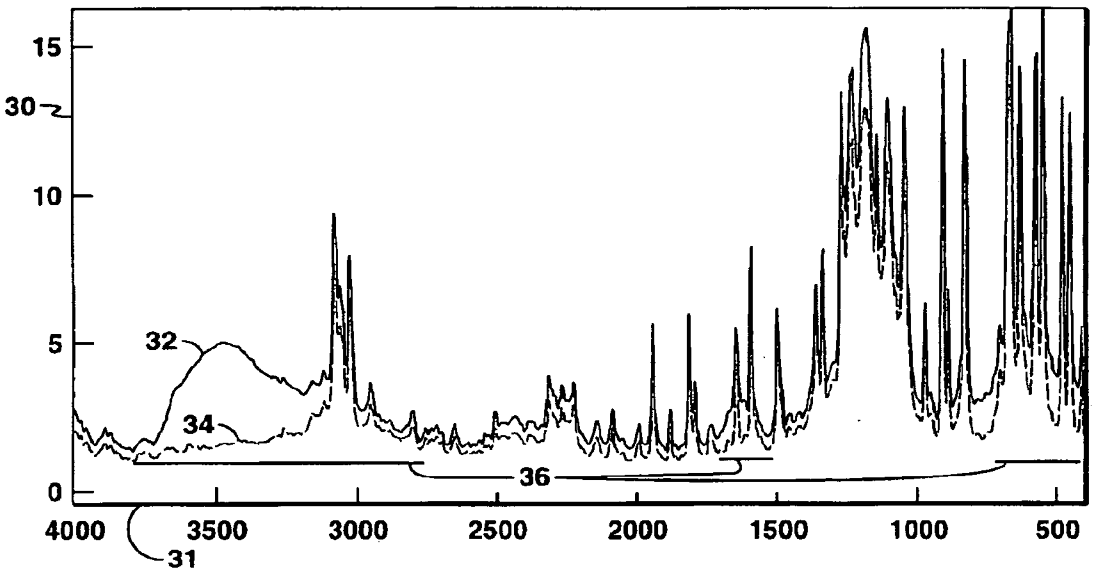
FIG. 3 is a Fourier Transform Infrared spectrum of 2,6-naphthalene disulfonic acid disodium salt, comparing thermal stability before and after TGA.

FIG. 3 demonstrates another test conducted on a PASS compound. A Fourier Transform Infrared (FTIR) spectrum was performed on the PASS additive 2,6-naphthalene sulfonic acid disodium salt (2,6-NDSS). Separate FTIR tests were performed before and after TGA. Thus, two different spectra are presented. The spectra are plotted on a graph of peak intensity on the y-axis 30 and Emission/Wavenumber (measured in $cm^{-1}$) on the x-axis 31. The spectrum before addition of the PASS additive is shown at 32, while the spectrum after addition of the PASS additive is shown at 34.

It can be seen from FIG. 3 that the two spectra 32, 34 have very similar fingerprints. Except for the loss of water of hydration 36, no change is observed in the FTIR spectrum 32. This indicates that the additives are thermally stable and fail to degrade upon heating up to 500° C. This also shows that the PASS compounds are water soluble.

Next, an interfacial tension, or IFT, test was conducted. A tensiometer was used in connection with a Pendant Drop method to test heavy oil—water interfacial tension. Two different fluids were tested. The table below lists the measured oil—water interfacial tension of an untreated Athabasca bitumen versus an Athabasca bitumen treated with 1-wt % (weight percent) solution of the sodium salt of naphthalene trisulfonic acid (1,3,6-NTSS). Testing was done for both fluids at 70° C.

| Interface | IFT @ 70° C. (dynes/cm) |
|---|---|
| Athabasca Bitumen/Water | 1.5 to 2.0 |
| Athabasca Bitumen/Water + 1% 1,3,6-NTSS | 1.5 to 2.0 |

It can be seen that no decrease in interfacial tension between the heavy oil and water is observed. In this respect, the IFT of each fluid was 1.5 to 2.0 dynes/centimeter (cm). This confirms that the PASS compounds do not exhibit a tendency to emulsify water into heavy oil. This is a desirable characteristic for a heavy oil demulsifier.

Another attribute of PASS molecules identified herein is strong adsorption onto the surface of heavy oil asphaltenes. To test this characteristic, asphaltenes were separated from Athabasca bitumen by the standard separation process of solvent de-asphalting with n-heptane. The separated asphaltenes were used as the adsorbent and 1,3,6-NTSS was used as the adsorbate. The following adsorption experiment was then conducted, as described below.

Seven solutions of 1,3,6-NTSS in the concentration range of $10^{-4}$ to $10^{-3}$ moles/liter were prepared. To 0.5 grams of powered asphaltenes was added 5 milliliters (ml) of the aqueous adsorbate solution. Each mixture was shaken on a wrist shaker for 30 minutes. After mixing, the concentration of 1,3,6-NTSS in the water phase was determined by UV-Visible absorption spectroscopy. An adsorption isotherm was generated.

Figure 4:
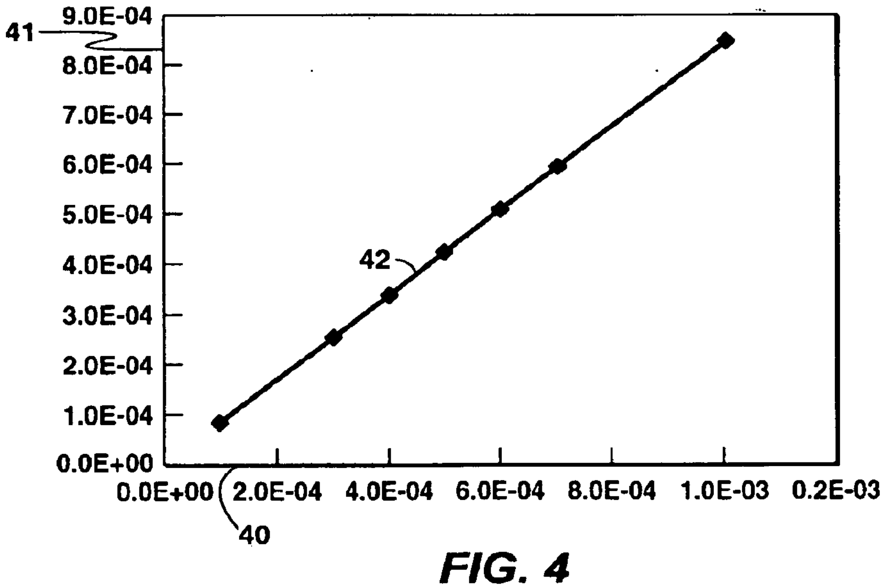
FIG. 4 is an adsorption isotherm for 1,3,6-NTSS adsorption on Athabasca asphaltenes.

FIG. 4 provides an adsorption isotherm for NTSS adsorption on Athabasca asphaltenes. A Cartesian coordinate plotting NTSS solution concentration 40 (measured in moles) against NTSS particles adsorbed 41 (also measured in moles) is presented. It can be seen from FIG. 4 that as the concentration 40 of the PASS compound increases, the adsorption 41 also increases in linear relation 42. Specifically, an adsorption equilibrium constant of 0.85 was measured. This value indicates strong adsorption of the 1,3,6-NTSS to heavy oil asphaltenes.

Next, testing was conducted to determine whether the PASS molecules alter the wetting character of heavy oil. Effective wetting of heavy oil without a reduction in heavy oil—water interfacial tension is desirable for an effective demulsifier of heavy oils. To make this determination, a contact angle wetting experiment was performed.

First, untreated Athabasca bitumen was coated on a glass slide. A water droplet was then placed onto the coated slide. The contact angle between oil and water was measured. A contact angle to water was measured as 130°. This indicates that the surface of bitumen is hydrophobic.

Next the Athabasca bitumen was treated with 1,3,6-NTSS. 5.0 g (acceleration due to gravity) of bitumen was mixed with 1 ml of a 0.1% NTSS solution at 70° C. The mixture was heated to 100° C. to evaporate off the water. The treated Athabasca bitumen was then coated on a separate glass slide. A contact angle to water of 0° was observed. Thus, the PASS molecule altered the wetting character of heavy oil. The contact angle experiment confirms the excellent wetting property of the PASS compounds.

The experiments described above demonstrate that PASS molecules possess the fundamental properties necessary to provide stability to a heavy oil—water core annular flow system. The amount of additive to be used for treatment in a flow regime ranges from about 0.001% wt. to about 5.0% wt. based combined amount of oil and water in the flow system. In one aspect, the PASS additive is provided at a range of about 10 parts per million (ppm) to about 2,000 ppm. Preferably, the PASS additives are present in the emulsion at about 100 ppm to about 1,000 ppm.

When injecting a PASS additive into a biphasic flow system, a delivery solvent may optionally be employed. Such solvents may include crude oil distillates boiling in the range of about 70° C. to about 450° C., alcohols, ethers and mixtures thereof. The delivery solvent is present in an amount of from about 35% wt. to about 75% wt. in the additive. When utilized, the delivery solvent may be included in the about 0.001% wt. to about 5.0% wt. demulsifier added to the emulsion.

Experimental

Laboratory experiments were conducted to demonstrate shear induced stability for Bitumen-Water biphasic systems stabilized with PASS molecules.

Example 1

1,3,6-NTSS as an Additive

In Example 1, demulsification tests were conducted on an Athabasca bitumen. Three samples were prepared. In one sample, the bitumen was left untreated; in a second sample the bitumen was treated with sodium silicate; and in a third sample, the bitumen was treated with the PASS additive 1,3,6-NTSS. Sodium silicate was chosen for the comparative second sample because it has been used commercially as an additive for core annular flow of heavy oil.

To prepare the three samples, 9 grams of hot (80° C.) froth Athabasca bitumen was added to 1 ml of water (with or without stabilizer). The mixtures were allowed to contact for 5 minutes and cool to 25° C. Each mixture was then sheared using a Silverson mixer for 5 minutes at 25° C. over a shear rate range of 650 to 4,000 reciprocal seconds ($s^{-1}$). After completion of mixing, the free water that remained in the jar as phase-separated liquid was removed using a pipette, and measured.

Figure 5:
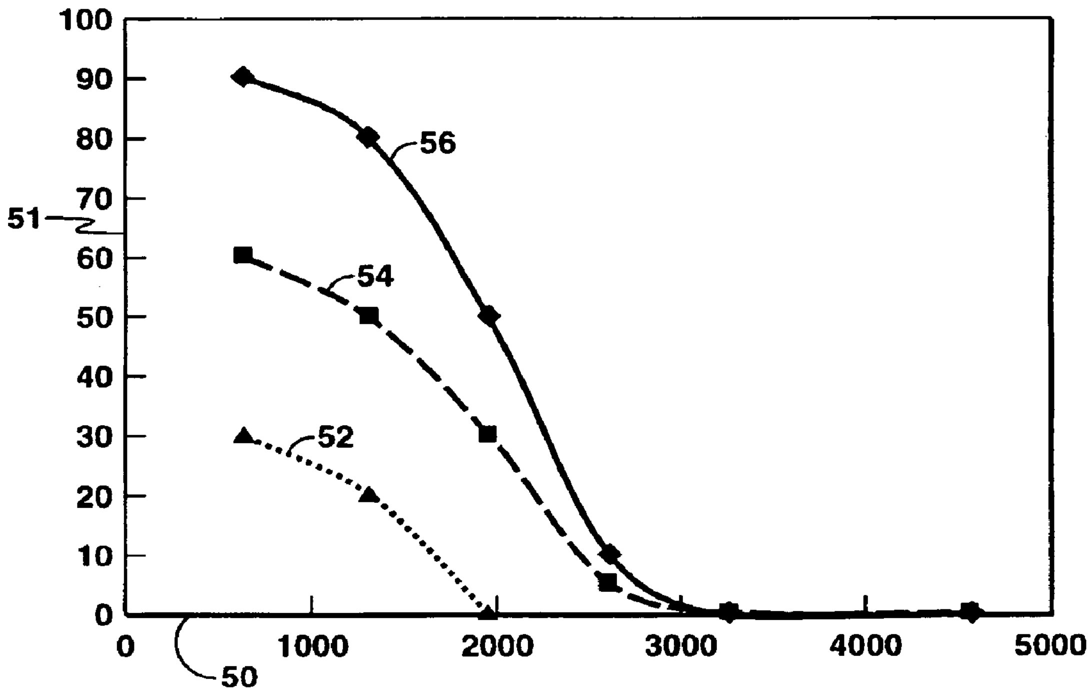
FIG. 5 is a graph of shear stability of a water-bitumen mixture, wherein the percent of free water was plotted as a function of shear rate and three different bitumen samples were compared—a control with no additive, a bitumen sample treated with sodium silicate, and a bitumen sample treated with 1,3,6-NTSS.

FIG. 5 provides a graph of shear stability of a bitumen—water interface. On the x-axis, shear rate 50 is charted from 0 to 5,000 $s^{-1}$. On the y-axis, the percent of free water 51 is provided. Three separate lines are demonstrated, representing:

No additive (untreated bitumen) as a "control" (denoted as 52);

0.1 wt. % sodium silicate additive—treated bitumen (denoted as 54); and 0.1 wt. % 1,3,6-NTSS additive—treated bitumen (denoted as 56).

It can be first seen from FIG. 5 that the control sample is represented by line 52. The control sample had the lowest relative percentage of free water 51. The control 52 had an initial free water concentration of 30%. As the shear rate was increased, substantial emulsion was generated at about 1,960 $s^{-1}$.

Next, the sodium silicate—treated sample is illustrated by line 54. The sodium silicate—treated solution experienced an initial free water amount of 60%. This was at the lowest shear rate 50 of 650 $s^{-1}$. As shear rate 50 increased, the sodium silicate—treated Bitumen emulsified at about 3,200 $s^{-1}$.

Finally, the 1,3,6-NTSS—treated Bitumen sample maintained the highest water separation. This is represented by line 56. The initial free water was about 90% at the 650 $s^{-1}$ shear rate, and reached a substantial emulsion at a shear rate 50 of about 3,200 $s^{-1}$. It can be observed that the 1,3,6-NTSS additive exhibited superior performance to both the solution with no additive and the solution with sodium silicate as a demulsifying additive.

Example 2

1,3,6-NTSS with Additive Concentration Varied

In another experiment, the concentration of the 1,3,6-NTSS PASS additive was varied in an oil—water mixture. The free water retention after 1,960 $s^{-1}$ shearing for 5 minutes was determined. The results are shown in FIG. 6.

Figure 6:
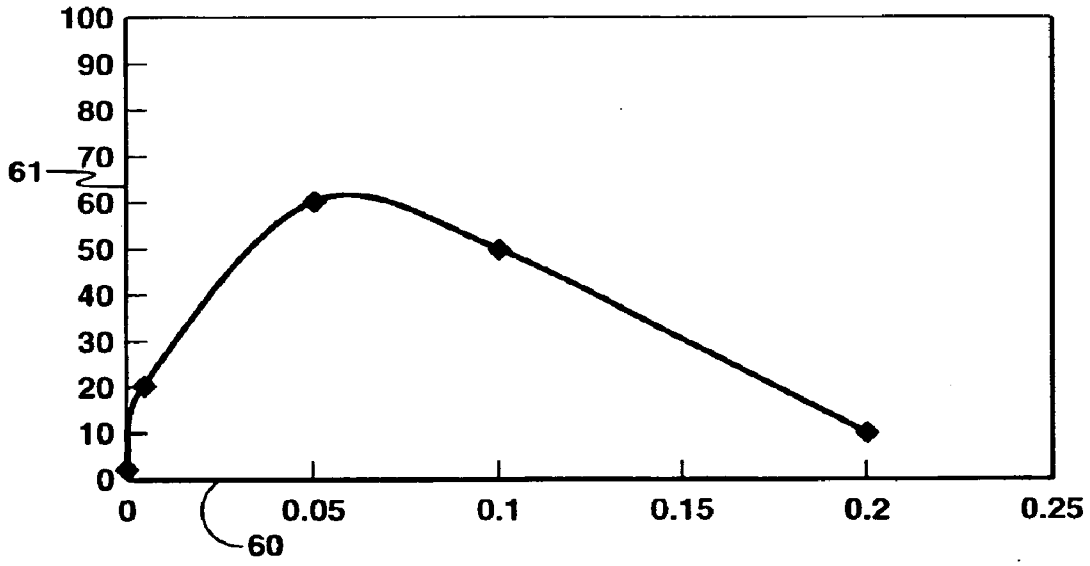
FIG. 6 is a graph of the effect of NTSS PASS additive concentration on free water in a bitumen sample.

In FIG. 6, NTSS concentration 60 is provided along the x-axis in weight percent of the solution. The NTSS concentration 60 is measured against the percentage of free water 61 in the solution. It can be seen that the percentage of free water 61 in solution peaks at approximately 62% when the NTSS concentration 60 is at about 0.06 weight percent. After the NTSS concentration 60 increases to about 0.06 weight percent, the percentage of free water 61 begins to decline. It is thus concluded that a wt. % of 0.5 to 0.6 of the additive provides maximum stabilization. Stated another way, a lower additive treat rate provides the best separation results. This is a cost benefit to the use of the PASS additive.

Example 3

Comparison of PASS Additives with Known Additives

Another experiment was conducted to evaluate the uniqueness and novelty of the PASS type chemical structures. To conduct the experiment, a base mixture of froth treated Athabasca bitumen was provided. The mixture was further mixed with distilled water. The ratio was about 90% wt. water and about 10% wt. oil. The mixture was tested at 25° C.

Five different Athabasca bitumen solutions were prepared in this manner and tested. One sample was left untreated, while the other four were treated with a demulsifying agent. The concentration for each additive was 0.0002 mol. %. After the samples were prepared, a shear rate of 1,960 $s^{-1}$ was applied at 300 rpm. This shear rate is considered severe compared to actual field conditions that are experienced. The percent of free water 71 remaining was then analyzed, with the results shown in FIG. 7.

Figure 7:
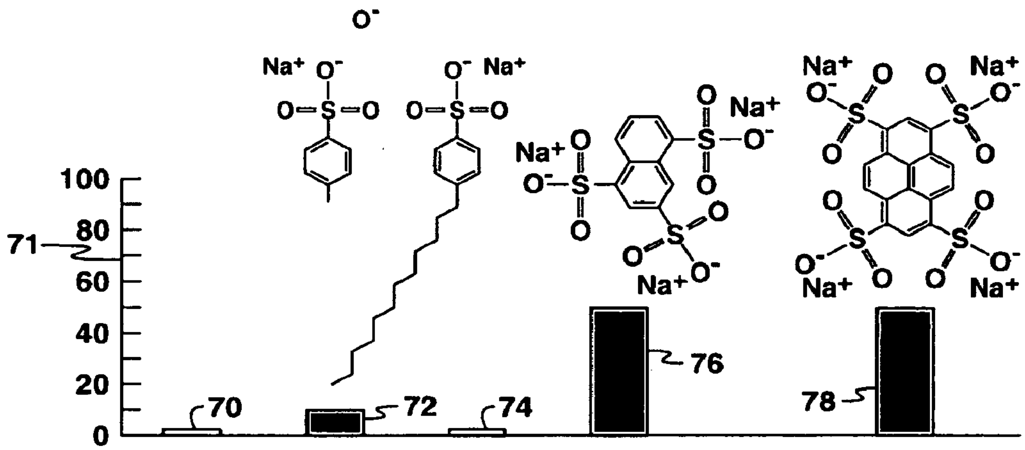
FIG. 7 is a bar graph comparing certain demulsifier additives, wherein samples treated with a PASS additive have a higher free water percentage than samples treated with previously known demulsifiers.

Bars are shown in FIG. 7 for the following water/bitumen samples:

No additive (denoted as 70);

Toluene mono sodium salt additive (denoted as 72);

$C_{12}$ Benzene sodium salt additive (denoted as 74);

Sodium salt of naphthalene trisulfonic acid (denoted as 76); and

Sodium salt of pyrene tetra sulfonic acid (denoted as 78).

It can be seen from FIG. 7 that the PASS-type additives 76, 78 provided substantially greater percentages of free water than either the control 70 or the other additives 72, 74. The PASS family of molecules, i.e., the salts of naphthalene and pyrene sulfonic acid 76, 78, were superior performers compared to the toluene 72 and the alkyl benzene 74 counterparts. In this respect, the percent of free water 71 remained higher for the PASS family of molecules 76 and 78.

Example 4

Comparison of PASS Additives with a Mixture of PASS Additives

Figure 8:
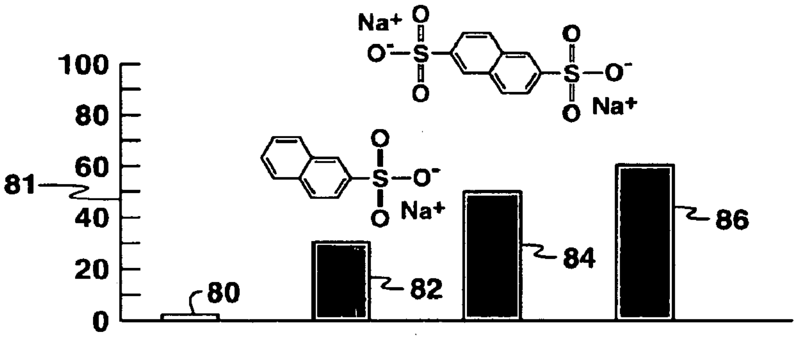
FIG. 8 is a bar graph comparing certain PASS additives, wherein comparisons are made to determine percentages of free water in solution obtained. The 50/50 mixture of NMSS/NDSS PASS molecules produced a higher free water percentage than the 2-NMSS or 2,6-NDSS additives alone.

In yet another experiment, the performance of selected PASS molecules was compared. FIG. 8 provides a bar graph comparing the selected PASS-type molecules.

To conduct the experiment, a base mixture of froth treated Athabasca bitumen was again provided. The mixture was further mixed with distilled water. The ratio was about 90% wt. water and about 10% wt. oil. The mixture was tested at 25° C.

Several PASS molecules were added to the oil/water samples. The concentration for each additive was 0.00022 mol. %. In FIG. 8, bars for the following additives are shown:

No additive (denoted as 80);

Sodium salt of 2-napthalene monosulfonic acid (2-NMSS) (denoted as 82);

Sodium salt of 2,6-napthalene disulphonic acid (2,6-NDSS) (denoted as 84); and 50/50 mixture of 2-NMSS and 2,6-NDSS (denoted as 86).

It can be seen that the 50/50 mixture of NMSS/NDSS 86 provided an enhanced performance than either the sodium salt of 2-napthalene monosulfonic acid 82 or the sodium salt of 2,6-napthalene disulphonic acid 84 alone. The NMSS/NDSS mixture 86 generated a free water percentage 81 of approximately 65%. Thus, it is observed that mixtures of PASS molecules provide opportunities for performance enhancement.

Example 5

Water Droplet Test

Still another experiment provides a water droplet test conducted on an oil water mixture. The oil was subjected to particle size analyses to detect the dispersed water droplets using the LASENTEC® particle video monitoring (PVM) and focused beam laser reflection (FBR) methods. The results of the experiment are demonstrated in FIG. 9.

Figure 9:
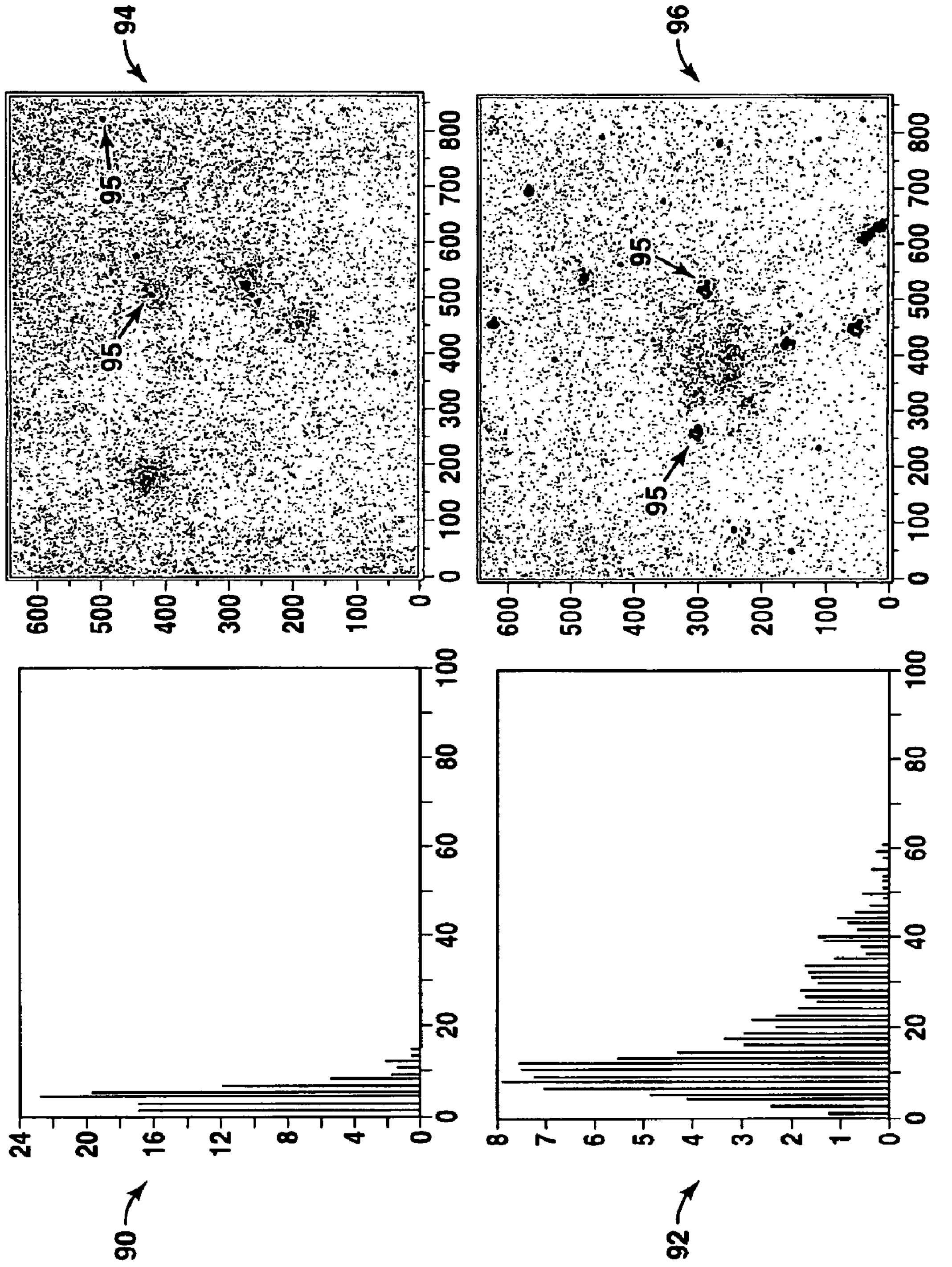
FIG. 9 provides screen shots of comparative water droplet tests along with two micrographs comparing water droplet coalescence. One sample was an untreated oil, while the other was an oil treated with 1,3,6-NTSS PASS additive.

First, FIG. 9 provides droplet size distribution charts 90, 92 in which water droplet size (in microns) in an untreated oil 90 is compared to water droplet size of an oil treated with 1,3,6-NTSS PASS additive 92. Each sample was sheared at a rate of 1,960 $s^{-1}$. It is seen in the second chart 92 that the NTSS additive not only maintained the core annular system stability during shearing, but additionally, whatever water was emulsified at 1,960 $s^{-1}$ shear is emulsified as relatively larger droplets.

Second, two micrographs 94, 96 are also provided in FIG. 9. The top micrograph 94 shows untreated oil, and the bottom micrograph 96 shows the PASS additive treated oil. It is observed in the second micrograph 96 that water droplets 95 in the treated oil were flocculated in contrast to the well dispersed water droplets 95' in the no-additive case shown in micrograph 94.

Shear-induced destabilization of a heavy oil—water core annular system presents a technical barrier to the movement of heavy oils. However, the observed results presented herein demonstrate that PASS molecules provide an effective additive to stabilize a heavy oil—water core annular system. While it will be apparent that the invention herein described is well calculated to achieve the benefits and advantages set forth above, it will also be appreciated that the invention is susceptible to modification, variation and change without departing from the spirit thereof.

What is claimed is:

1. A method for enhancing the shear stability of a high-viscosity fluid—water biphasic flow system, comprising:

injecting an additive into the biphasic flow system, the additive comprising a salt of a polynuclear aromatic sulfonic acid, wherein the additive has the structure:

$$Ar—(SO_3^-X^+)_n$$

wherein:

"Ar" is a homonuclear or heteronuclear aromatic ring of at least 6 carbon atoms, "X" is selected from Group I and II elements of the long form of The Periodic Table of Elements, and "n" ranges from 1 to 10, wherein the biphasic flow system is a core annular flow system, and wherein the core annular flow system is a pipeline for transporting hydrocarbons, a production tubing in a wellbore or a flowline in a gathering system for hydrocarbons.

2. The method of claim 1, wherein the high-viscosity fluid comprises heavy oil.

3. The method of claim 2, wherein the heavy oil is bitumen.

4. The method of claim 1, wherein "X" is selected from the group of elements consisting of sodium, potassium, calcium and magnesium.

5. The method of claim 1, wherein the salt is a sodium salt.

6. The method of claim 1, wherein the salt is one of a sodium salt, a potassium salt, a calcium salt and a magnesium salt.

7. The method of claim 1, wherein the polynuclear aromatic sulfonic acid additive is a polynuclear aromatic group that contains no alkyl substituents.

8. The method of claim 1, wherein the polynuclear aromatic sulfonic acid additive is 1-naphthalene sulfonic acid.

9. The method of claim 1, wherein the polynuclear aromatic sulfonic acid additive is 2,6 naphthalene disulfonic acid.

10. The method of claim 1, wherein the polynuclear aromatic sulfonic acid additive is 1,5 naphthalene disulfonic acid.

11. The method of claim 1, wherein the polynuclear aromatic sulfonic acid additive is 1,3,6 naphthalene trisulfonic acid.

12. The method of claim 1, wherein the polynuclear aromatic sulfonic acid additive is 1,3,6,8-pyrene tetrasulfonic acid.

13. The method of claim 1, wherein the additive is a mixture of two or more sodium salts of polynuclear aromatic sulfonic acids.

14. The method of claim 1, wherein the amount of additive present in the biphasic flow system is from about 0.001% weight (wt.) to about 5.0% wt. based on the combined amount of oil and water in the flow system.

15. The method of claim 1, wherein the amount of additive present in the flow system is from about 10 parts per million (ppm) to 2,000 ppm.

16. A method of transporting heavy oil through a tubular body, comprising:
- placing a heavy oil in a tubular body that is a pipeline for transporting the heavy oil, a production tubing in a wellbore or a flowline in a gathering system for hydrocarbons;
- pumping the heavy oil through the tubular body within an annular flow of water;
- subjecting the water in the tubular body to a salt of a polynuclear aromatic sulfonic acid additive so as to improve shear stability of the heavy oil and water, wherein the additive has the structure:

$$Ar—(SO_3^-X^+)_n$$

wherein:
- "Ar" is a homonuclear or heteronuclear aromatic ring of at least 6 carbon atoms,
- "X" is selected from Group I and II elements of the long form of The Periodic Table of Elements, and
- "n" ranges from 1 to 10.

17. The method of claim 16, wherein "X" is selected from the group of elements consisting of sodium, potassium, calcium and magnesium.

18. The method of claim 16, wherein the salt is one of a sodium salt, a potassium salt, a calcium salt and a magnesium salt.

19. The method of claim 18, wherein the polynuclear aromatic sulfonic acid additive is a polynuclear aromatic group that contains no alkyl substituents.

20. The method of claim 16, wherein the polynuclear aromatic sulfonic acid additive is 1-naphthalene sulfonic acid.

21. The method of claim 16, wherein the polynuclear aromatic sulfonic acid additive is 2,6 naphthalene disulfonic acid.

22. The method of claim 16, wherein the polynuclear aromatic sulfonic acid additive is 1,5 naphthalene disulfonic acid.

23. The method of claim 16, wherein the polynuclear aromatic sulfonic acid additive is 1,3,6 naphthalene trisulfonic acid.

24. The method of claim 16, wherein the polynuclear aromatic sulfonic acid additive is 1,3,6,8 pyrene tetrasulfonic acid.

25. The method of claim 16, wherein the additive is a mixture of two or more sodium salts of polynuclear aromatic sulfonic acids.

26. The method of claim 16, wherein the additive is mixed with a solvent as a delivery carrier.

27. The method of claim 26, wherein the solvent is one of crude oil distillates boiling in the range of about 70° C. to about 450° C., alcohols, ethers, and any mixtures thereof.

28. The method of claim 26, wherein the delivery solvent is present in an amount of from about 35% weight (wt.) to about 75% wt. in the additive.

29. The method of claim 16, wherein the additive is mixed with water as a delivery carrier.

* * * * *